United States Patent
Rudent et al.

(10) Patent No.: US 6,670,582 B2
(45) Date of Patent: Dec. 30, 2003

(54) MICRO-THERMOCOUPLE FOR A MASS FLOW METER

(75) Inventors: Pascal Rudent, Montpellier (FR); André Boyer, Montpellier (FR); Alain Giani, Le Cres (FR); Pierre Navratil, Montpellier (FR)

(73) Assignee: Societe Qualiflow SA, Montpellier Cedex (FR)

( * ) Notice: Subject to any disclaimer, the term of this patent is extended or adjusted under 35 U.S.C. 154(b) by 0 days.

(21) Appl. No.: 10/136,267

(22) Filed: May 1, 2002

(65) Prior Publication Data

US 2002/0121136 A1 Sep. 5, 2002

Related U.S. Application Data

(62) Division of application No. 09/028,745, filed on Feb. 24, 1998, now abandoned.

(30) Foreign Application Priority Data

Dec. 30, 1997 (EP) .............................................. 97403184

(51) Int. Cl.⁷ ................................................. G01F 5/00
(52) U.S. Cl. ................... 219/209; 73/204.26; 73/204.27
(58) Field of Search ................................. 219/209, 543; 73/204.27, 204.25, 204.26, 204.11; 374/164, 182, 179

(56) References Cited

U.S. PATENT DOCUMENTS 4,782,708 A * 11/1988 Harrington et al. ...... 73/861.05
6,354,150 B1 * 3/2002 Rudent et al. ............. 73/202.5

FOREIGN PATENT DOCUMENTS

JP 63-231271 * 9/1988

* cited by examiner

*Primary Examiner*—John A. Jeffery
(74) *Attorney, Agent, or Firm*—Young & Thompson

(57) ABSTRACT

Construction of a micro-thermocouple sensor designed to be incorporated in a mass flow meter for the circulation of gaseous fluids, includes of the following steps: depositing an insulating layer of several microns by electron gun on the sensor tube, then depositing the components of the thermocouple, by the electron gun, through the nickel masks, at a residual pressure lower than $10^{-6}$ torr, at a thickness of several thousand Angstroms, annealing of the capillary tube for one hour, then the mounting of a heating element on the capillary tube treated in this manner.

6 Claims, 2 Drawing Sheets

MICRO-THERMOCOUPLE FOR A MASS FLOW METER

RELATED U.S. APPLICATIONS

The present invention is a divisional application of U.S. Ser. No. 09/028,745, filed on Feb. 24, 1998 by the current inventors, having the title "PROCESS FOR THE CONSTRUCTION OF A MICRO-THERMOCOUPLE FOR A MASS FLOW METER", now abandoned.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention presented here is in the domain of devices for the measurement of the flow rate of liquids in a channel.

The thermocouple according to the invention is designed to be incorporated in a mass flow meter which is placed in a system for the management and control of the circulation of high purity gas, for example.

These mass flow meters usually consist of a capillary tube for the circulation of fluids, on which the representative measurements of the flow are carried out, and which is arranged in parallel with the main circuit of fluid circulation.

BACKGROUND OF THE INVENTION

Numerous types of mass flow meters are already known to the professional. They are most often based on a local heating of the passing fluid in the capillary tube, and a measure of the variation in the resistance of the resistive components as a function of the temperature, the aforementioned measurement being representative of the flow of the gas in the tube, and thus of the flow rate. The measurement resistances are most often simply wound around the insulated capillary tube (U.S. Pat. No. 3,938,384).

In the patent entitled DIRECTION SENSITIVE FLOW-RATE INDICATOR (EP 0313 120), Bronkhorst presents a flow indicator device sensitive to the flow of gas in two perpendicular directions by the use of two thermocouples placed in orthogonal directions on a substrate.

In another application, MASS FLOW METERS WITH TEMPERATURE SENSORS (EP 0395 126 B I), Bronkhorst proposes a geometry of the tube having a very elongated U, and equipped with a series of thermocouples placed symmetrically and a central heating resistance in two parts, possibly with Peltier cooling components, for the stage of problems of errors in measurement associated with a circulation of air to the outside of the sensor or internal convection to the capillary tube.

There are many other documents, patents or articles in scientific journals involving thermocouples designed to be integrated into mass flow meters.

BRIEF SUMMARY OF THE INVENTION

The invention presented here proposes a new process for constructing the thermocouple.

According to a second goal of the invention, the process for constructing the device makes it possible to manufacture thermocouples having known characteristics in a precise and reproducible manner.

The device which is the object of the invention is thus a process for constructing the micro-thermocouple sensor designed to be incorporated into a mass flow meter for the circulation of gaseous fluids, comprising the following steps:

deposit of an insulating layer on the sensor tube,
then the deposit of the components of the thermocouple,
then annealing of the sensor,
then the mounting of a heating element on the tube treated in this manner.

Preferentially:
the deposit of the insulating layer on the sensor tube is done to several microns by electron gun,
the deposit of the thermocouple components is also carried out by electron gun, obliquely through the nickel masks, at a residual pressure lower than 10' Torr, at a thickness of several thousand Angstroms; and
annealing of the capillary tube is done for one hour.

These steps make it possible to construct a thermocouple set upon a capillary tube, with a high degree of manufacturing precision and the final characteristics of the thermocouple, and an excellent manufacturing reproducibility.

According to one particular embodiment, the heating component for the thermocouple for the mass flow meter takes the form of a winding of a filament in an alloy of nickel (75%) and chromium (25%), having a diameter of several tens of microns.

According to another embodiment, the heating element takes the form of a c sleeve on which the CMS resistors are mounted.

According to yet another embodiment, the heating element is deposited on the tube by electron gun, the material of this element is a nickel chromium alloy, and the resistor, mounted in the central region of the thermocouple, includes a central region and two contacts at its ends, and two successive stages of deposition are carried out, with the nickel masks adapted to the different geometries of the resistor and the contacts.

According to yet another embodiment, the heating element includes one thermocouple materials and the heating effect is obtained by the Joule effect in an alternative scheme.

These devices correspond to the embodiment variations and make it possible to obtain either devices which are more economical to manufacture, or devices which are very precise, according to the requirements.

The description which follows, made with regard to the attached drawings in the goal of explaining and in no way limiting, makes it possible to understand the advantages, goals, and characteristics of the invention.

DETAILED DESCRIPTION OF THE INVENTION

Figure 1:
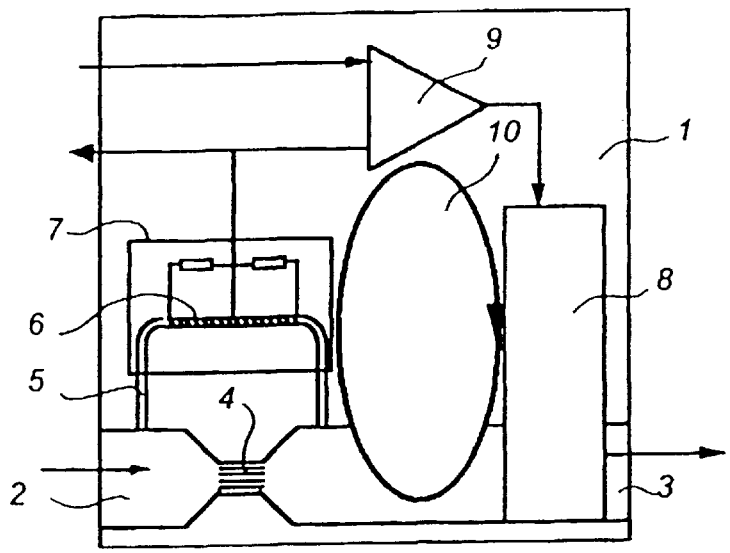
FIG. 1 is a schematic view showing the functional design of a flow meter from traditional technology.

As is depicted according to a traditional arrangement in FIG. 1, a flow meter 1 is inserted into a gas circulation line, and includes a gas input 2 and a gas output 3 (the direction of the circulation of the gas is symbolized by the arrows). The circulation of the gas has a laminar restriction 4 in the flow meter 1 in the main section of the gas passage, having a branch passage (bypass) 5 in parallel which circulates a part of the gas flow into a capillary tube 6 in the sensor 7.

The flow meter 1 also includes a valve 8 for controlling the gaseous flow 2, which regulates the flow, and an electronic circuit 9 which is of the comparator type (P.I.D., i.e. Proportional Integrator Differentiating circuit) between an externally transmitted control variable and the measurement made by the sensor 7. A control loop 10 of the type known to the professional performs the automatic functional control of the flow rate 1.

In so far as its principle is concerned, the sensor 7 receives and heats up a small part of the laminar flow (at full scale 10 cm$^3$/min), which is proportional to the total flow. The mass flow rate is estimated based on the thermal transfer which it generates: the profile of the temperature without circulation of the gas 11 along the capillary tube 6 of the sensor 7 heated on one part of its length is changed into an asymmetrical profile 12 when the gas circulates in the capillary tube 6, and this temperature difference between the upstream 13 and the downstream 14 of the capillary tube 6 is a measurement of the mass flow.

Figure 2A:
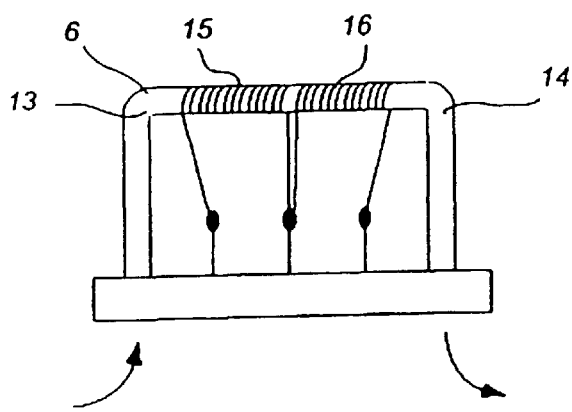
FIG. 2A is a plan view of a traditional flow sensor.
Figure 2B:
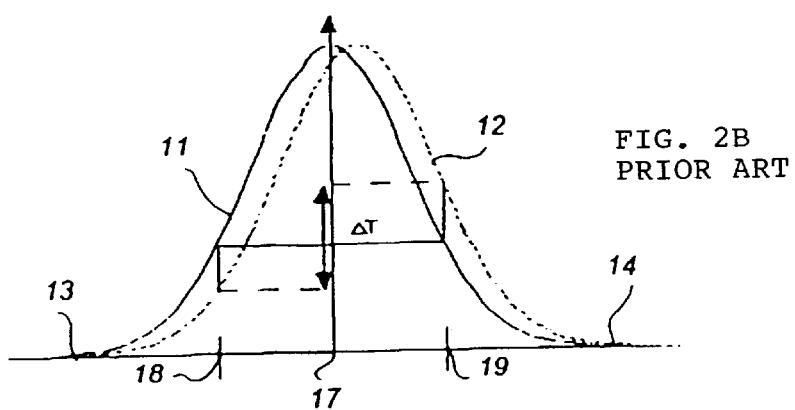
FIG. 2B is a graph illustration showing the functional principle of the traditional flow sensor.

The flow sensor, in the traditional device not according to the invention, comprises, as viewed in FIGS. 2A and 2B, two coils 15, 16 of resistive wire, which ensure two simultaneous functions: heating and temperature measurement.

This temperature measurement is obtained by measuring the variation of the two resistances, mounted in a traditional manner in a Wheatstone bridge. The application of a constant current between the resistor connecting terminals which are selected at the equivalent value R (at the same temperature) induces heating of the capillary tube at the two adjacent locations.

In the absence of the circulation of gas in the capillary, the temperature distribution is represented by the curve 11 in FIG. 2 (the curve shows the value of the temperature in the ordinate (y) axis, and the distance along the tube in the abscissas (x) axis) and is, of course, symmetrical with respect to the center 17 of the two coils 15, 16. On the contrary, in the case of the circulation of gas in the tube (curve 12), the temperature distribution is asymmetrical, and it is seen that between the two points 18, 19 equidistant from the center 17 of the coils 15, 16, a temperature difference $\Delta T$, which results in the different measurements of the resistance for the two resistive components 15, 16, R−δR and R+δR.

In a thermocouple sensor, the mounting with the two resistances in the Wheatstone bridge is functionally replaced by a thermocouple which, as is known, includes two different materials such that a difference of the temperature observed between these materials induces the appearance of a directly measurable electric current which results in a mounting which is more simple than the traditional design having two measurement resistances.

In a preferred embodiment of the invention, the couple Bi(n)—Sb(p) (bismuth-antimony) is used based on thin film technology. The thermoelectric power of this couple, on the order of 120 microV/° C., is achieved by optimizing the parameters of the deposit temperature of the substrate, the speed of the deposit, temperature (0–100° C.) and the duration of the annealing.

Various embodiment modes of the thermocouples have been conceived. In one preferred embodiment detailed in FIG. 3, the structure is made up of a heating element 20, a wire made of an alloy of nickel (75%) and chromium (25%) which has the characteristic feature of having a high resistivity (1.33 Ohm.mm2.m−1) and a low coefficient of variation of resistance as a function of temperature (10 ppm/° C.) (its diameter is 28 microns and it is powered by a current of 12.5 mA), and of the thermocouple Bi(n)-Sb(p) comprising of two side areas 21,22 of bismuth surrounding a central area 23 made of antimony.

Before the deposit of the active elements, an insulating layer of zirconia ($ZrO_2$), not shown, is deposited on the capillary tube 6 of a metallic nature. The zirconia ($ZrO_2$), selected for its good stability and its good dielectric characteristics, is deposited by electron gun on the capillary tube 6 of the sensor, at a thickness of 2.5 microns. The substrate, made up of a capillary tube 6 made of stainless steel 316L, is supported on a heating support not shown but of a type known to the professional. It is preferable that the substrate support be in rotation during depositing.

The deposit of the insulating layer is done by the addition of oxygen into the enclosed space of the deposit. The parameters for the deposit by electron gun of the zirconia on the capillary tubes 6 are thus the following: target: $ZrO_2$, thickness deposited: 2 to 3 microns, residual pressure: lower than $10^{-6}$ Torr, O2 pressure: 8 $10^{-5}$ Torr, substrate temperature: 300° C., speed of deposition: 20 to 40 Angstroms per second.

Figure 3:
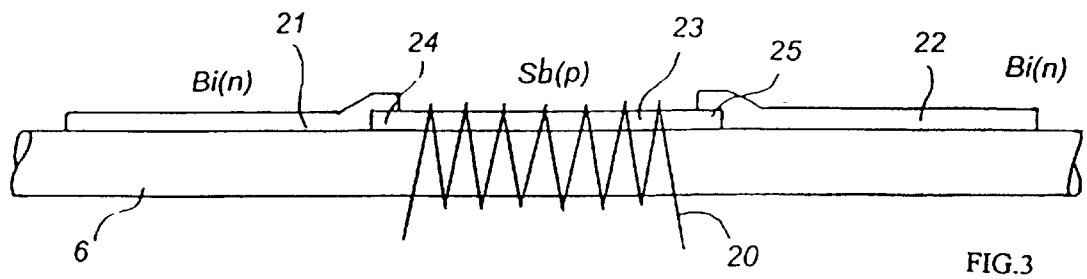
FIG. 3 is a sectional view showing the design of the structure of the thermocouple according to the invention.

The depositing of the components of bismuth 21, 22 and antimony 23 of the thermocouple are carried out in a manner known to the professional, with typically a depositing by electron gun, through the nickel masks, at a residual pressure lower than $10^{-6}$ Torr, and at a thickness of several microns. As can be seen in FIG. 3, the bismuth deposits 21, 22 overlap the edges 24, 25 of the central deposit 23 in antimony (configuration NPN).

The resistive wire making up the heating component 20 is wound around the zone having the antimony deposit 23.

The functioning mode of the device is identical to the traditional function the context of a mass flow meter 1 on a thermocouple for a fluid circuit.

In a variation not shown, the couple Bi2Te3(n)-Bi2Te3(p) (bismuth telluride), in thin film technology, is used to replace the couple Bi(n)-Sb(p).

The sensitivity obtained is on the order of 400 microV/° C. in the temp (range of 0° C.–150° C.

Figure 4:
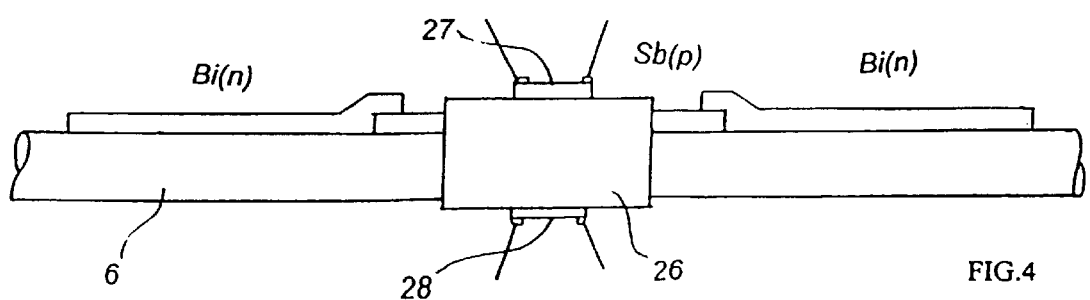
FIG. 4 is a sectional view showing the design of a structural variation of the thermocouple according to the invention.

In another variation presented in FIG. 4, the heating element 20 is a copper sleeve on which the resistors 27, 28 of the CMS type are mounted. The copper sleeve performs the function of making the temperature on one section of the capillary tube 6 uniform.

Figure 5:
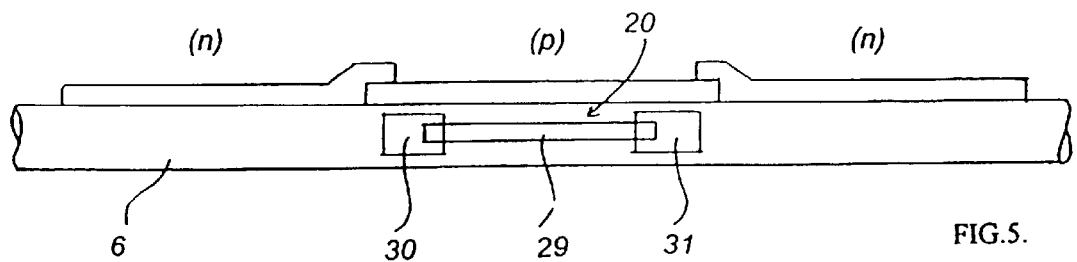
FIG. 5 is a sectional view showing the design of another variation of the thermocouple according to the invention.

In yet another structural variation, presented in FIG. 5, the heating element 20 is deposited on the tube 6 by a method known to the professional, for example, by electron gun or by magnetron pulverization. The material of this element is a nickel-chromium alloy. The resistor, deposited on the antimony area 23 of the thermocouple, includes a central zone 29 and two contacts 30, 31 at its ends. In the case of the deposit by electron gun, two stages of successive depositing are imagined with the nickel masks adapted to the different geometries of the central region 29 of the resistor and the contacts 30, 31.

Figure 6:
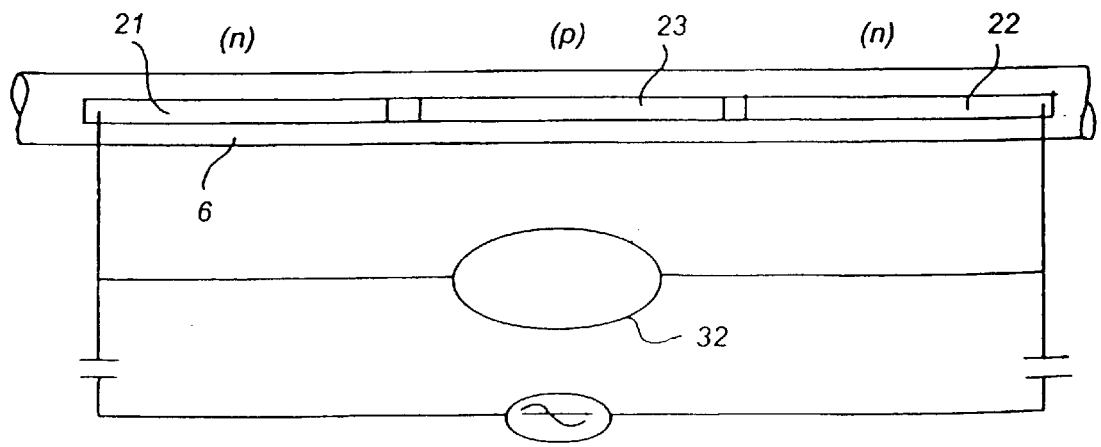
FIG. 6 is another sectional view showing the design of another variation of the thermocouple according invention.

In a third embodiment of the structure presented in FIG. 6, the heating component 20 is made of one of the thermocouple materials. It is then heated by the Joule effect in an alternative scheme. During the functioning of the mass flow measurement device, when the gas is circulating, the temperature difference between the two junctions of the thermocouple is determined by a continuous micro-voltmeter 32, from the impedance value of the elevated input.

The range of the invention presented here is not limited to the embodiment methods presented but, on the contrary, extends to improvements and modifications which are conceivable to the professional.

We claim:

1. A micro-thermocouple sensor for use in a mass flow meter for a gas circuit, the sensor comprising:

a metallic capillary tube having an insulating layer extending therearound and thereover, said tube having a central area, a first side area on one side of said central area and a second side area on an opposite side of said central area;

a first active element deposited on said first side area;

a second active element deposited on said second side area, said second active element being of an identical material as said first active element;

a third active element deposited on said central area, said third active element having a first edge at one end and a second edge at an opposite end, said third active element being of a different material than said first and second active elements, said first active element overlapping said first edge of said third active element, said second active element overlapping said second edge of said third active element, said first active element and said second active element and said third active element and said capillary tube being annealed together; and a heating element extending over said third active element.

2. The sensor of claim 1, said first and second active elements being of a bismuth material, said third active element being of an antimony material.

3. The sensor of claim 1, said heating element being a wire wound around said third active element in said central area, said wire being of an alloy of 75% by weight of nickel and 25% by weight of chromium.

4. The sensor of claim 1, said heating element being a copper sleeve onto which resistors are mounted.

5. The sensor of claim 1, said heating element being of a material identical to a material on said capillary tube.

6. The sensor of claim 1, said heating element being a deposit of a nickel-chromium alloy on said central area, said heating element having ends contacting respectively said first and second active elements.

* * * * *